Sept. 16, 1941.  L. L. LINANE ET AL  2,255,796
METHOD OF TENDERIZING AND SHAPING FRESH MEAT
Filed Feb. 19, 1940
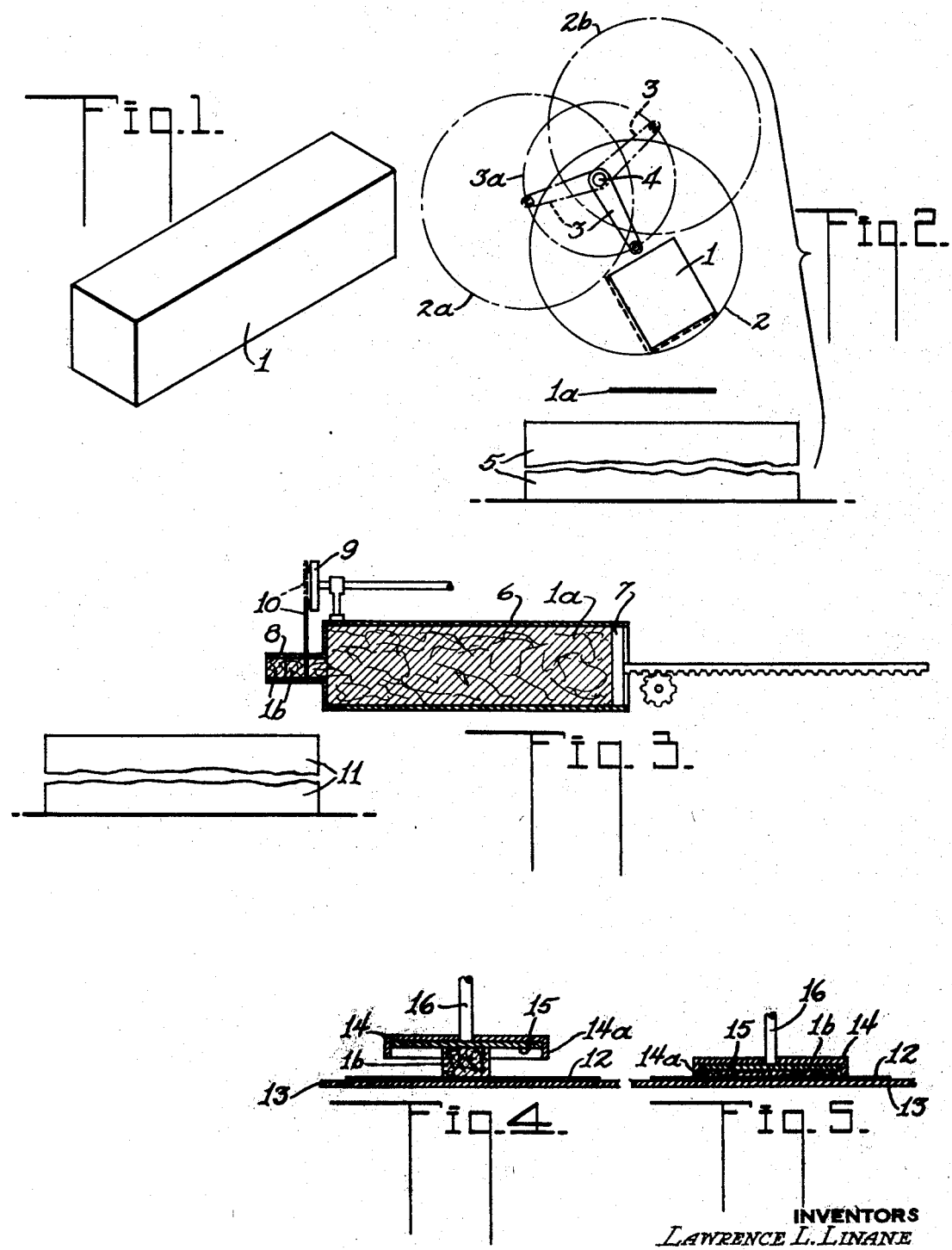
INVENTORS
*LAWRENCE L. LINANE*
BY *GEORGE FEDERIGHI*
ATTORNEYS Patented Sept. 16, 1941

2,255,796

UNITED STATES PATENT OFFICE 2,255,796

METHOD OF TENDERIZING AND SHAPING FRESH MEAT

Lawrence L. Linane and George Federighi, San Francisco, Calif.

Application February 19, 1940, Serial No. 319,588

8 Claims. (Cl. 99—107)

Our invention relates to improvements in a method of tenderizing, and it consists of the steps of the process or method hereinafter described and claimed.

We have found that if cuts of meat are prepared and handled as is commonly done in the trade, the size of the cuts varies and also the quality of the meat varies. It is a purpose of our invention to always have a uniform quality and size, so that the meat will be standardized.

An object of our invention is to provide a method of tenderizing and shaping fresh meat, poultry, fish, etc., which consists in initially lowering the temperature of the product to a sufficient degree to permit it to be cut into paper-thin slices, chipped or shredded. This step tenderizes the product.

The steps for shaping the tenderized product consists in separating it into equal quantities by weight, or mass, and then in separately forming each quantity into a desired shape, including a spinning operation.

Other objects and advantages will appear in the following description, and the novel steps will be set forth in the appended claims.

Our invention is illustrated in the accompanying drawing forming part of this specification, in which:

Figure 1 is an isometric view of an edible substance, such as meat, fish, poultry, etc., moulded into a block of the shape shown;

Figure 2 is a schematic view illustrating the cutting of the edible product into paper-thin slices;

Figure 3 is a longitudinal sectional view showing diagrammatically how the tenderized product is separated into amounts of equal mass; and Figures 4 and 5 are vertical sections showing how each separated mass is independently spun into a predetermined shape.

While we have shown only the preferred steps of our method it should be understood that various changes or modifications may be made within the scope of the appended claims without departing from the spirit of the invention.

In carrying our invention into practice, we take an edible product, such as fresh meat, poultry, fish, or the like, and after removing the bones and any other unedible portions, we compress the product into a mold of any desired dimensions. The product is compressed sufficiently in the mold to eliminate any voids or air spaces. The fresh meat, or the like, in the mold may consist of pieces of meat, etc., too tough to eat and the same may be true of poultry, fish, etc.

Fresh meat at normal atmospheric temperatures is too soft to be sliced very thin, because the knife will tear the meat fibers apart rather than slice through them. If the meat is lowered in temperature sufficiently to make it firm, then it may be readily sliced thin. The meat should not be frozen solid, because it will then be too hard for slicing. A temperature from 28° F. up to 38° F. is ideal for slicing purposes. We have also found that slicing can be effectively carried out when the outer surface of the meat is lowered to a point where it will become firm. The interior of the meat need not be at so high a temperature. Meat placed in a freezing temperature or lower for a period from eight to twenty hours will be ready for thin slicing.

In Figure 1 we illustrate the molded meat or other edible product at 1. The meat has been lowered in temperature ready for slicing and already it has been stated that this temperature may be between 28° to 38° F. Although we have shown the molded meat in the shape of a block, we do not wish to be confined to any particular shape. The shaping of the meat in the manner shown adapts it to being cut into paper-thin slices.

After the molding and freezing steps, the meat is tenderized by thin-slicing, shredding or chipping. The meat is not ground as when making hamburger, because the grinding operation squeezes the meat and makes it lumpy. We have found that tough and cheap cuts of meat may be tenderized by thin slicing.

In Figure 2, we illustrate the step of thin-slicing the meat on an automatic slicer. The molded product 1 is shown in end elevation in this view, and a rotating meat-cutting knife 2 is illustrated as cutting through the meat. The disc knife 2 is rotatably supported on an arm 3, which in turn is swung about a center support 4. The arm 3 may be swung in a clockwise direction and the large broken-line circle 2a shows the knife 2 just as it leaves the meat 1, while the second large broken-line circle 2b shows the knife just ready to make another cut.

Any means (not shown) may be used for advancing the meat or knife with respect to each other to cause the paper-thin slices to be cut. One of these slices is shown in edge view at 1a and the slice will drop into a receptacle 5. The swinging of the arm 3 about its pivot 4 is shown by a small broken-line circle 3a. If the temperature of the product during the thin-slicing operation has been too low, the sliced meat is permitted to thaw until it reaches workable temperature of 37° to 38° F. A temperature between 33° F. to 50° F. is sufficient to permit the meat to pass through the following step.

The tenderized meat is removed from the receptacle 5 and is separated into equal portions by weight, or mass. This step is illustrated in Figure 3. The tenderized meat 1a is placed in a cylinder 6 and a pinion and rack-moved piston 7 is used for forcing the meat through an outlet orifice 8. An eccentric 9 or any suitable mechanism is used for reciprocating a knife 10 that cuts the tenderized meat 1a into masses of equal size or weight shown at 1b. The separated masses are cylinders of meat of a desired weight, such as two to four ounces. These separated and tenderized masses 1b drop into another receptacle 11. The cutting of the meat into masses 1b also automatically weighs the meat, because each mass will be of the same weight.

The final step of spinning each separated mass 1b into a predetermined shape or "steak" is shown in Figures 4 and 5. The mass 1b is placed on a paper 12, which in turn rests on a support 13. A non-rotatable shaping die 14 cooperates with a spinning die 15 to flatten and spread the mass 1b into a disc of the desired thinness. The die 15 is rotated by a shaft 16, which in turn is rotated by any means (not shown). The shaft 15 may also be raised and lowered to raise and lower the spinning die 15. The die 15, when raised, will lift the cup-shaped die 14 clear of the support 13.

Figure 4 shows the start of the meat-shaping step. The mass 1b rests on the paper and the double die 14—15 has descended to a point where the rotating die 15 will start to spread the meat. The undersurface of the die is preferably provided with a spiral groove or grooves (not shown) for moving the meat radially outwardly until it reaches the inner wall of the rim 14a. The die 14 is held against rotation and, therefore, it will not tear the paper 12 when it comes into contact therewith.

The completion of the shaping step is shown in Figure 5. Here the rotating die 15 has spread the meat until it fills the space defined by the rim 14a, die 15, and paper 12. The double die is now lifted and the completely shaped and tenderized product 1a is removed with the paper. The same operation is repeated for each article. The spinning of the tenderized meat weaves it into a solid tenderized steak. The spun steaks can vary in circumference according to the size and weight desired.

The spun steaks can be sold either fresh, or they may be quick frozen at a temperature of 0° to −10° F. This quick freezing seals the juices in the steaks. The term "meat" in the specification and claims includes fresh or cured meat, poultry, fish, etc. The spun steaks are of uniform quality and size. The steaks may be packaged and sold to the trade.

It will be noted that during our "spinning" operation, the upper and lower surfaces of the tenderized mass of meat are twisted in opposite directions, which causes the mass to be woven into a solid compact steak. Pressure is applied to the mass of tenderized meat in an axial direction as the spinning takes place and at the same time the mass of meat is caused to expand outwardly.

We claim:

1. The herein described method of preparing tenderized steaks, or the like, which consists in molding odd pieces of meats into a compact mass, lowering the temperature of the mass sufficient to permit thin-slicing, thin-slicing the meat for tenderizing it, separating the tenderized meat into equal masses, and weaving the thin slices in each mass under pressure to form a compacted steak.

2. The herein described method of preparing tenderized steaks, or the like, which consists in molding meat into a compact mass, lowering the temperature of the mass sufficient to permit thin-slicing, thin-slicing the meat for tenderizing it, separating the tenderized meat into masses, and spinning the latter masses individually and under pressure for weaving the thin slices into a compacted steak.

3. The herein described method of preparing a tenderized steak, or the like, which consists in thin-slicing meat for tenderizing it, and spinning the tenderized meat under pressure for weaving the thin slices to form a compacted steak.

4. The herein described method of forming tenderized steaks which consists in molding and freezing meat to a desired temperature and shape, thin-slicing the meat, separating the meat into masses of uniform weight, and in spinning each mass while simultaneously compressing it for weaving the thin slices into a compacted steak.

5. The step of forming thin sliced meat into a steak of the desired shape which consists in spinning the meat under pressure to weave the thin slices to form a compacted steak.

6. The herein described method of preparing a tenderized steak from a mass of solid meat, or the like, which consists in lowering the temperature of a mass of the meat sufficient to permit thin-slicing, thin-slicing the meat for tenderizing it, and subjecting the tenderized mass of meat to pressure to compress the same while twisting one portion thereof relative to another to weave the mass into a compact solid steak.

7. The herein described method of preparing a tenderized steak from a mass of solid meat, or the like, which consists in lowering the temperature of a mass of the meat sufficient to permit thin-slicing, thin-slicing the meat for tenderizing it, compressing the slices thus produced into a compact unit, cutting a predetermined quantity of meat from the unit, and subjecting the cut unit to pressure to compress the same and expand it outwardly into a desired shape while at the same time twisting one surface thereof relative to another surface thereof to weave the unit into a compact solid steak.

8. The step in the herein described method of preparing thin sliced meat into steaks which consists in weaving the thin slices under pressure to form a compacted steak.

LAWRENCE L. LINANE.
GEORGE FEDERIGHI.